Sept. 15, 1931.  C. DE LUKACSEVICS  1,823,591
LAVA EARTHENWARE OR MINERAL FRICTION ELEMENT OR LINING
FOR RAILWAY AND OTHER BRAKES IN GENERAL
Filed Dec. 14, 1925   2 Sheets-Sheet 2
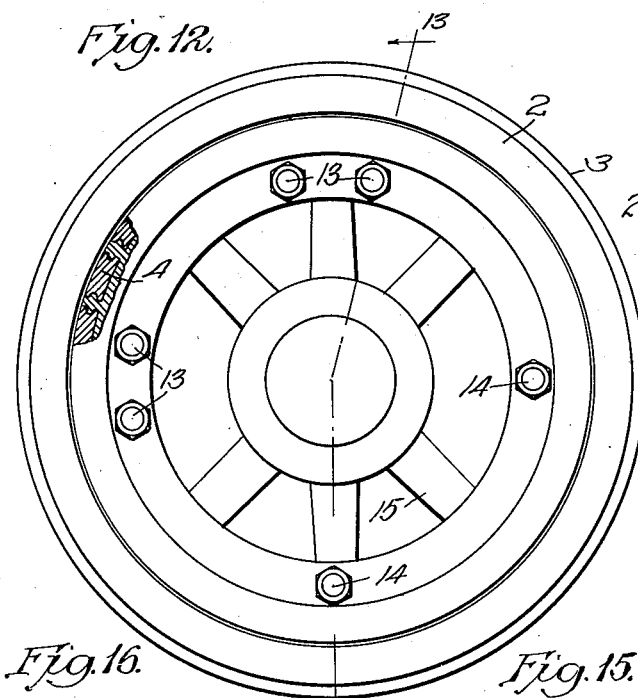
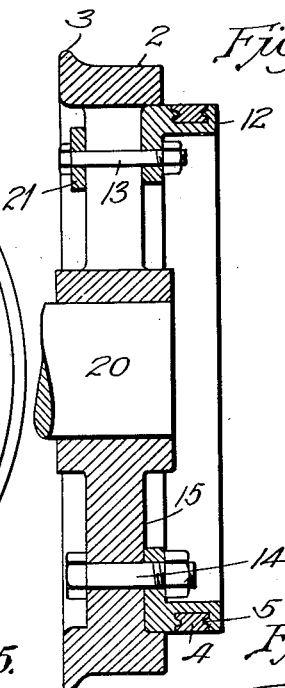
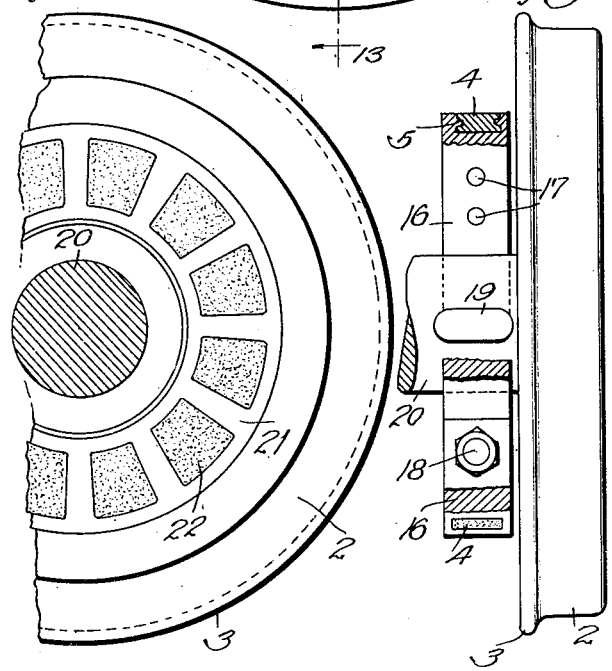
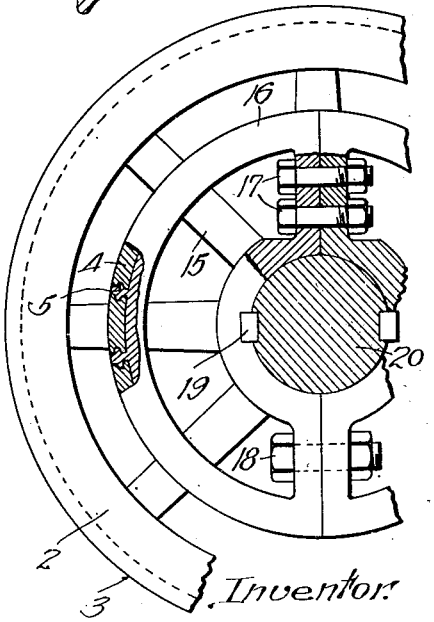
Inventor:
Charles Delukacsevics.
By Stanley Lightfoot
Attorney Patented Sept. 15, 1931

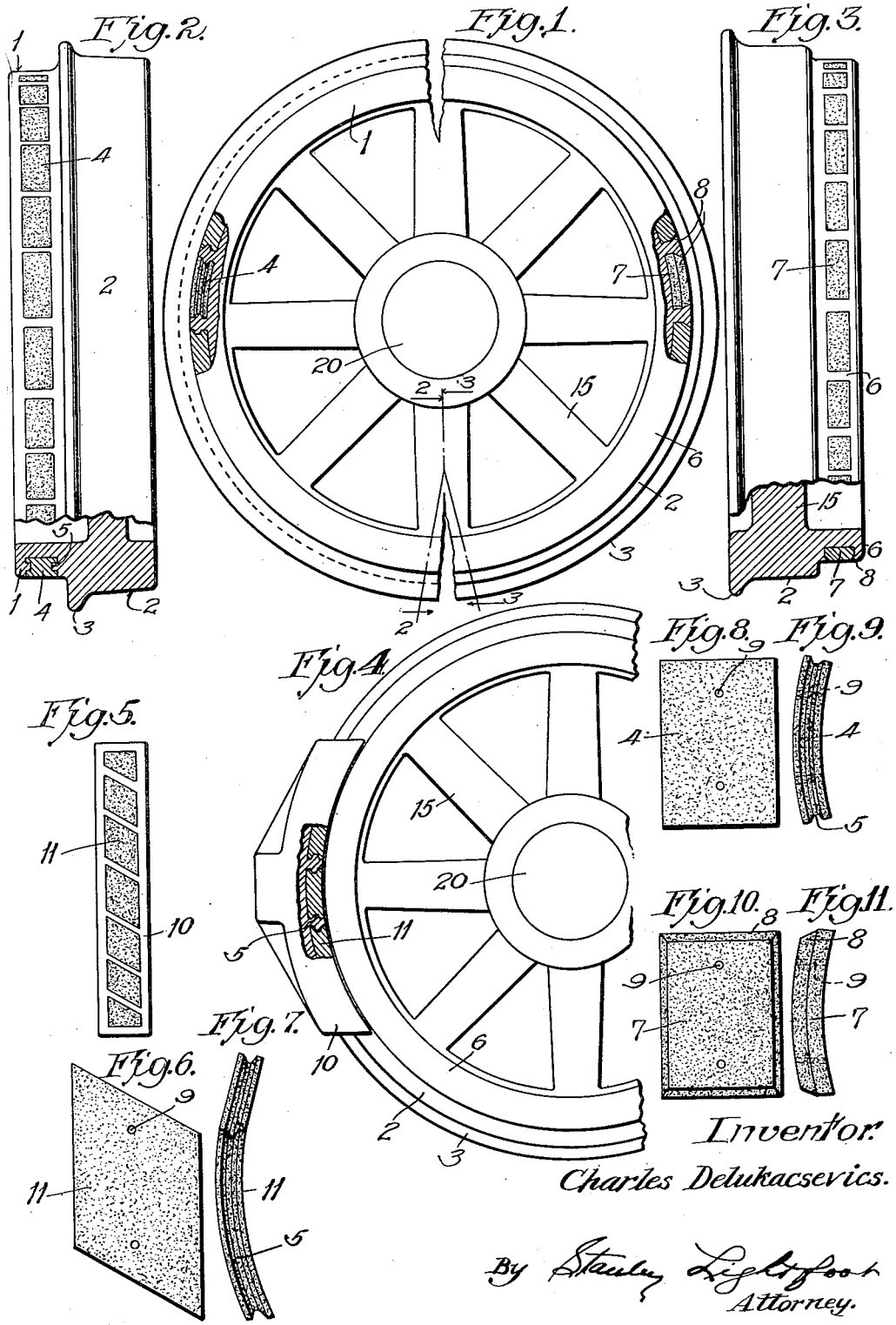

1,823,591

UNITED STATES PATENT OFFICE

CHARLES DE LUKACSEVICS, OF DETROIT, MICHIGAN, ASSIGNOR TO HERBERT V. BOOK, OF DETROIT, MICHIGAN

LAVA-EARTHENWARE OR MINERAL FRICTION ELEMENT OR LINING FOR RAILWAY AND OTHER BRAKES IN GENERAL

Application filed December 14, 1925. Serial No. 75,455.

This invention relates to railway brakes or their linings and is more especially directed to provide a non-metallic brake element or lining for railway brakes adapted for high-efficiency in the carrying out of their braking function and at the same time withstand undue wear and preclude overheating.

It is well known that brakes irrespective of their environment are subjected to the most pronounced conditions tending to effect rapid wearing away of the parts and this condition is augmented by the heat of friction which results when the brakes are applied. It is the desideratum to provide braking surfaces which will not only minimize wear on the working parts, but which will also eliminate or reduce the effects of heating, thereby establishing dependable, uniform braking service whose efficiency with use is increasing instead of decreasing.

The overheating of brakes is a common occurrence more especially in railway rolling stock, where it is not uncommon but a frequent occurrence for cars passing along steep grades to melt the brake shoes or evaporate the oil from bearings, or take fire from over-heated brakes, endangering the life of passengers, and causing innumerable damages. It is highly important, therefore, to provide, as the friction element of brakes, means which will result in minimum heating, and which will, even when overheated, withstand high temperature which might otherwise result in combustion.

Long and exhaustive experimentations have led to the conception by me of the utilization of thoroughly non-inflammable, non-metallic, but earthenware and unusually hard material, or minerals or their compositions, capable of presenting a highly frictional surface, particularly adapted to braking purposes, and of such characteristics that wear is negligible and burning impossible and heat generating reduced.

I have discovered that brake parts constructed from lava, either in its natural mineral state, or in an artificial or synthetic state, or other earthenware, such as fire-clay, porcelain, spar, etc. or certain minerals may be utilized to great advantage for the purposes specified.

I have also discovered that some of the earthenwares or clays that are highly vitreous and when fired become intensely hard, or certain minerals, such as mica, may be utilized advantageously for the same purposes as above specified.

I have further discovered that lava when fired under high temperature becomes intensely hard, heat resisting and non-heat generating, and therefore, it would be advantageously qualified for the purposes specified. The lava used may be of the natural lava, earthenwork or mineral rock cut or ground into appropriate shape or such natural mineral may be pulverized or comminuted to form a very fine powder which may be compounded with suitable binding agents, clays, or spar and thereupon molded or compressed in suitable dies or molds and heat treated to render it very hard.

It is found that heat treatment of between 1800 and 2800 degrees Fahrenheit is thoroughly satisfactory in practice and the material thus treated becomes highly vitreous, is non-combustible, non-heat generating but heat resisting and porous though intensely hard, much harder than any hardened steel. In fact, it positively will reduce or eliminate heat generating and will resist heat much higher than any other substance previously used in brake construction or in friction elements even when subjected to dry friction.

I also discovered that the heat treatment of lava—either natural state or compounded— at various heat applications, alter their expansions, or shrinkages, suitable to the expansions and shrinkages of the metal in which they are imbedded, or, become associated with, thus adapting themselves to being regulated to desired shrinkage or expansions as the case may demand. In other words, by means of varied heat treatment lava may be cured to alternating expansions, corresponding to the expansions of steel, cast iron, aluminum, or any other metal or substance that lava as lining may associate with.

The present invention while particularly directed to the use of the so-called, "lava", is not restricted however to this particular material as other mineral earths or earthenware material, preferably of a vitreous nature, may be employed in lieu of the preferred lava material without departing from this invention.

The present invention is not restricted to any particular structural shapes or detailed configurations for embodiment in:—brakes intended for all purposes, as friction linings.

However, that the invention may be more clearly understood I might state that I find that lava has the highest frictional coefficiency above all substances. Its expressed co-efficiency is (1)—It has three or more times more than any other substance used at the present time. Therefore, I wish to direct attention to the well known fact that up to the present time the various friction elements that have been used for railway brakes were either metal to metal, hardened or natural state; soft metal to hard metal; various asbestos fibre compositions; various fibrous brake linings; fibre and metal compositions; various metal compositions whose inefficient application is apparent and by no means solving the problem of friction elements, and all of which under the friction are either generating too excessive heat or greatly reducing their frictional efficiency in overheated conditions,—aside from the fact that their application is always connected with adjustments and replacements. All of them wear excessively and un-uniformly, decreasing the frictional coefficiency continuously, thereby transferring excessive and uneven wear to rails. They are either polishing or cutting the friction and rolling surface to such an extent that their replacement or repair becomes necessary. In other words, none, in their performance, of the present type elements are either uniform or lasting.

While the lava as predescribed is immensely hard, rendering wear negligible, the frictional members lined with lava or earthenware friction element are not affected by heat generations, hence the lava is non-heat generating, but heat resisting, which disposition lends control to the lava friction elements to eliminate common over-heating, even if it is subjected to dry friction. The immense hardness of the lava or heat treated earthenware eliminates undue wear, thereby establishing dependable, uniform and lasting braking service, freeing wheels and rails from the effect of brake friction.

In order, however, that the invention may be clearly understood, I have illustrated in the accompanying drawings different practical embodiments of the invention. These showings are for the purpose of illustration only and are not intended to restrict the application of the invention. They, however, embody numerous novel features of construction, which I also consider a part of this invention.

Features of the invention, other than those adverted to will be apparent from the hereinafter detailed description and claims, when read in conjunction with the accompanying drawings.

In the accompanying drawings:

Figure 1 is illustrating a dual front and rear elevation and showing partial sections in which lava insert anchorings are shown. The left side of the illustration shows the brake drum provided to extend to the left of the rail-flange while the right side of the same illustration shows the brake drum provided extending at the right of the rail-flange.

Figure 2 is a sectional end elevation of Figure 1 at line 2—2 Fig. 1, showing the brake drum extending inwardly partly in section and partly in elevation.

Figure 3 is a similar illustration of Figure 2 of the opposite side of Figure 1 showing the brake drum extending outwardly on the line 3—3 of Fig. 1.

Figure 4 is an elevation showing the adaptation of the present invention to a brake assembly unto a railway wheel, having outwardly extending brake drum formed from the wheel tire and brake shoe in contact with said drum, which is partly in section showing the imbedded friction elements.

Figure 5 is a front face elevation of the brake shoe.

Figure 6 is a front elevation of an earthenware brake shoe segment being part of this invention.

Figure 7 is a side elevation of Figure 6.

Figure 8 is a front face elevation of an earthenware brake drum segment being part of this invention.

Figure 9 is a side elevation of Figure 8.

Figure 10 is a front face elevation showing different anchoring means of a segment.

Figure 11 is a side elevation of Figure 10.

Figure 12 is a front elevation of a railway wheel whose brake drum is of a detachable type and part is shown in section.

Figure 13 is a vertical section at line 13—13, Fig. 12.

Figure 14 is a rear end elevation of a fragmental railway wheel showing a brake drum attached to shaft or axle of the wheel.

Figure 15 is a side elevation of Figure 14 in which the drum is partly in section.

Figure 16 is a rear elevation of fragmental railway wheel showing the adaptation of the present invention as a disc brake.

The brake drum (1) as shown at the left side illustration of Figure 1 is formed directly from the wheel tire (2) and is protruding inwards from the wheel flange (3). The friction surface of said brake drum (1) is provided with earthenware, mineral or lava friction element segments (4) which are imbedded in the drum (1) and rigidly associated with said drum by means of anchoring grooves (5) surrounding the sides of said segments.

The opposite side of Figure 1 shows a different execution of a wheel in which the brake drum (6) is similarly formed directly from the wheel tire (2) but it is extending outwardly from the wheel flange (3) and is shown provided with differently shaped mineral, earthenware or lava friction element or lining segments (7) whose anchoring means are composed of tapering sides (8).

The lava or earthenware segments on their faces have small drillings for the purpose that by means of nails or pegs said segments may be held located within the mold, die or core in which the wheels or shoes with which they are to be associated are cast.

Thus in these illustrations and in the above description, a new type of railway wheel is introduced provided with an earthenware or lava lined brake drum formed of the very same body of the wheel yet independently serving the braking purpose, however, separating the effect of friction from the rolling surface of the wheel. Therefore, the heat generation caused by the friction during the braking process is confined to the brake drum and is not transmitted to the rolling surface from where it could be transferred to the rails, neither could it be transmitted to the wheel shaft and its bearing boxes.

Hence, the heat treated earthenware or lava friction lining segments (4) or (7) which are associatedly embodied in the brake shoes (10) and drums (1) or (6) are non-heat generating but heat-resisting. The usually generated heat by friction becomes greatly minimized or consumed by the said friction elements and its effect isolated from the wheels, rails, axles and its bearings.

However, that the present stock of railway car wheels may be conveniently provided with braking facilities of similar character, various means of adaptations of the present invention in this direction are shown in Figures 12 to 16 inclusive.

As it appears in Figures 12 and 13, an independent detachable brake drum (12) may be bolted to the spokes (15) or web of the wheel (2) by means of bolts (13 or 14) of which the former are clamping said brake drums to the spokes or web when locating themselves by the side of either each or each second spokes, the bolt heads anchoring themselves upon backing plate or ring (21) embracing the rear face of spokes or web while the bolts (14) are only singly located and are penetrating through the spokes or web for the same purpose of joining the detachable drum (12) to the wheel either inwardly or outwardly extending.

Still another adaptation of the present invention is shown in Figures 14 and 15 in which parted brake drum pairs (16) by means of bolts (17) or (18) may join said brake drum halves directly to the axle (20) being anchored to same by means of keys (19) resting partly in the axle and partly in the drum halves. Naturally the drum halves are similarly provided with earthenware or lava lining segments (4).

However, various other means may be developed for attaching lava or earthenware lined brake drums other than those above described which could be easily devised by anyone becoming acquainted with the purpose or nature of this invention. Therefore, same should not restrict the present invention or confine same to only this method. Aside of the use of brake drums in co-relation with fitting concave faced brake shoes, different type of braking means may be provided for railway rolling stocks as shown in Figure 16, in which the interior face instead of spokes (15) or web is provided with a friction disc (21) having earthenware or lava frictional lining disc segments (22) imbeddedly associated with for braking purposes to substitute or convert from peripherical practice to radial disc surfaces in which case similar discs which imbedded earthenware linings may substitute the brake shoe also.

Naturally, while the adaptation of friction discs in place of friction drums for braking purposes forms also part of this invention, it is not meant that the invention should be restricted in any way or manner to just the shown adaptation as it is evident that any one may develop same idea which is my invention to indefinite extent when becoming familiar with the herein disclosed discoveries pertaining to brakes for railway rolling stocks.

Here it is timely to remark that the present invention virtually resides in the aforedescribed means of adaptations, but more particularly in the provision of mineral, earthenware or lava friction elements or linings either in solid or segmental bodies as friction surface lining in conjunction and corelation with the pre-described various means of applications to effect an always-dependable uniform, intensely hard, non-wearing, non-heat generating but heat-resisting braking surface of high frictional co-efficiency.

The discovery of the utilization of kilned lava or kilned earthenware refractory friction element for the utilization as brake lining for contacting surfaces is very important for both types of brakes; railway brakes and automotive brakes, and it should be understood that in each case I propose to line the drum, as well as the shoe, with either kilned lava or kilned earthenware refractory friction element. And, therefore, it should be understood that the operation of such brakes, I proposed in my present invention to always have lava lined contacting surfaces. In other words, the friction brakes placed between lava and lava, therefore, the heat generation becomes equalized, as well as the frictional torsion, hence both members are intensely hard and of even disposition and are not compressible by the expansion of the one influencing the other.

It also appears that the providing of earthenware or lava segments embodied in the brake members would be only one of the methods of execution which should not restrict the invention to the particular practice. Hence the said earthenware segment linings may be associated with the friction members by other means of embodying, for instance, they may be riveted or bolted to the friction surfaces of the friction members or may be joined by means of dovetailings or may be clamped on, or various means of attachings may be developed by any one becoming acquainted from reading this specification.

It is to be understood that all the earthenware or lava segments, either in natural or synthetic state, are heat-treated at from 1600° to 2400° Fahrenheit whereby they become intensely hot and non-heat generating.

For the discovery of eliminating noises when brakes are applied resides in the fact that when refractory earthenware or lava is imbedded in metal due to their differences in molecular vibrations they counteract the development of sounds.

In the foregoing detailed description I have set forth different practical embodiments of the invention with a view to showing it's wide adaptability and at the same time illustrating certain novel features of construction forming part of this invention. I am aware that the structures may be changed by employing variously combined other constructions and that certain details of construction illustrated in connection with certain embodiments of the invention may be utilized to advantage in one connection with other embodiments of the invention. These changes will be manifest to those skilled in the art after reading the foregoing description, and I, therefore, wish it understood that the present invention is not restricted to the exact co-relation of parts described.

Moreover, I am fully aware that the invention embodies numerous features of advantage in construction, some of which may be employed without necessarily employing all. I, therefore, wish it further understood that the present invention is not restricted to specific disclosure of any of the several embodiments illustrated.

Having thus fully described the invention, what I claim as new and desire to secure by Letters Patent, is:

1. In a brake, a brake drum, and a brake shoe, said brake shoe having a frictional surface for cooperation with said drum, said surface containing lava.

2. In a brake, a brake drum and a brake shoe, said brake shoe having a frictional surface for cooperation with said drum, said surface being composed of heat treated natural mined lava.

3. In a brake, a brake drum and a brake shoe, said brake shoe carrying segmental friction surface, each segment of said surface being composed of natural mined lava.

4. In a brake, a brake drum and a brake shoe, said brake shoe carrying a segmental friction surface, each segment of said surface being composed of an inorganic material heat treated to expand and contract in direct proportion to the expansion and contraction of said shoe.

5. In a brake, a brake drum and a brake shoe, said brake drum and said brake shoe each carrying segmental friction elements, each segment of each of the elements being carried by said shoe composed of a heat treated non-metallic material.

6. In combination in a brake, a brake drum and a brake shoe having frictional elements, said elements containing lava.

7. In combination in a brake, a brake drum and a brake shoe having frictional elements therebetween, said frictional elements being composed entirely of lava.

8. In combination in a brake, a brake drum and a brake shoe having friction elements therebetween, said friction elements being composed of a lava compound.

9. In combination with a brake, a plurality of friction elements, each of said elements being composed of a heat-treated compound of lava and another non-metallic earthen material.

10. In combination with a brake, a plurality of friction elements, each of said elements being composed of a heat treated compound of lava, an earthen material and a suitable binder.

CHARLES DE LUKACSEVICS.